United States Patent [19]

Henkel

[11] 4,231,044
[45] Oct. 28, 1980

[54] POSITIONING AND ORIENTING A MOBILE EQUIPMENT CARRIER FOR AN ANTENNA MAST

[75] Inventor: Otto Henkel, Delmenhorst, Fed. Rep. of Germany

[73] Assignee: Vereinigte Flugtechnische Werke-Fokker GmbH, Bremen, Fed. Rep. of Germany

[21] Appl. No.: 943,044

[22] Filed: Sep. 18, 1978

[30] Foreign Application Priority Data

Sep. 21, 1977 [DE] Fed. Rep. of Germany ....... 2742431

[51] Int. Cl.³ .......................... H01Q 1/32; H01Q 1/08
[52] U.S. Cl. ................................... 343/881; 343/713; 280/763; 52/110
[58] Field of Search ............... 343/711, 713, 715, 880, 343/883; 280/763; 52/110

[56] References Cited

U.S. PATENT DOCUMENTS

| 2,860,342 | 11/1958 | Warnery | 343/881 |
| 3,263,232 | 7/1966 | Burwell et al. | 343/713 |
| 3,377,595 | 4/1968 | Carr et al. | 343/713 |
| 3,714,660 | 1/1973 | Scrafford et al. | 343/883 |
| 4,146,897 | 3/1979 | Wilson et al. | 343/882 |

*Primary Examiner*—Eli Lieberman
*Attorney, Agent, or Firm*—Smyth, Pavitt, Siegemund, Jones & Martella

[57] ABSTRACT

A single axis vehicle for an antenna mast can be positioned by means of three hinged, legs held against the equipment by means of chains whose effective length is individually adjustable by means of travelling nut-spindle assemblies to orient the mast by matching the hinge angle of each leg to the terrain.

5 Claims, 2 Drawing Figures

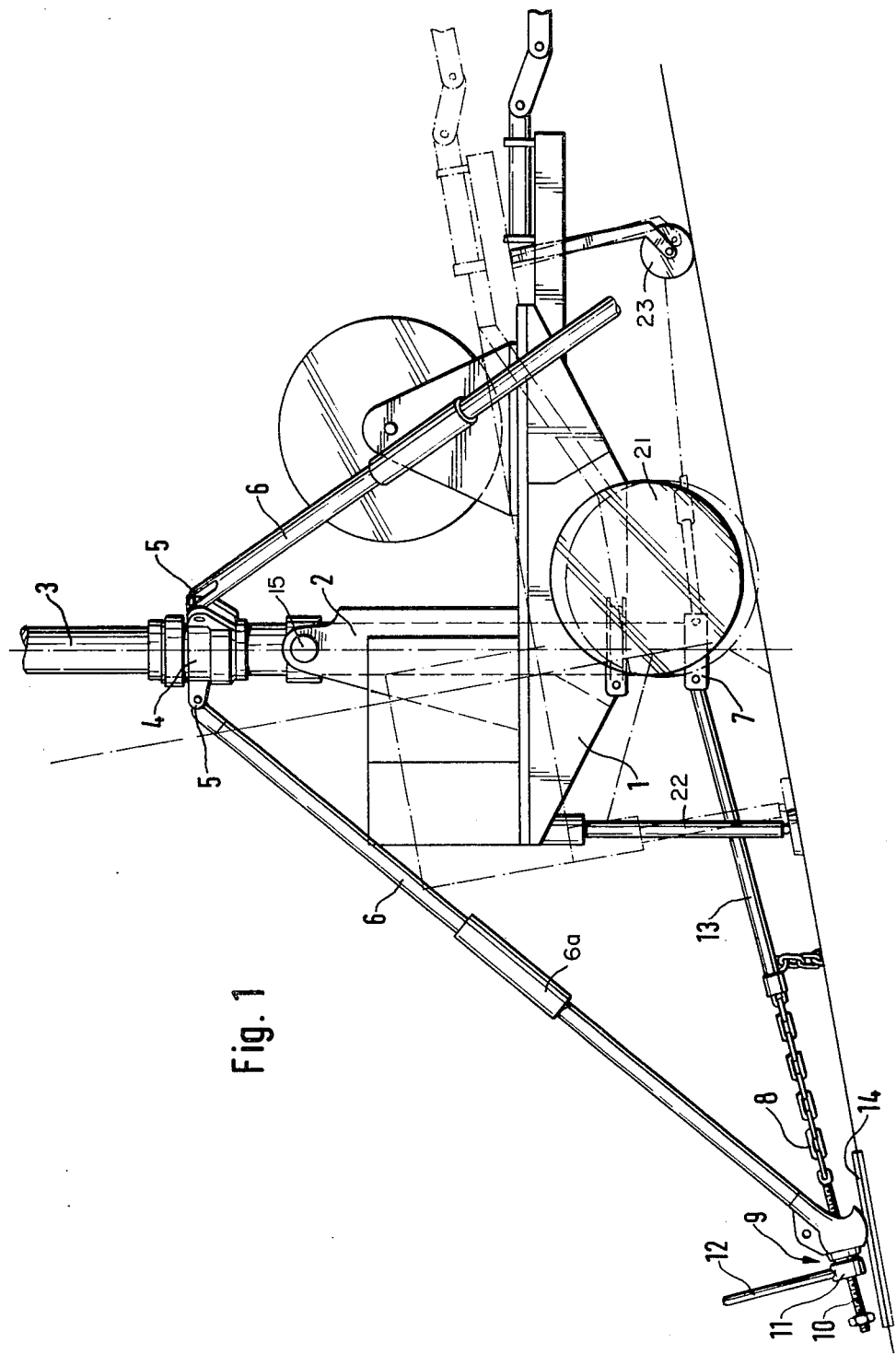

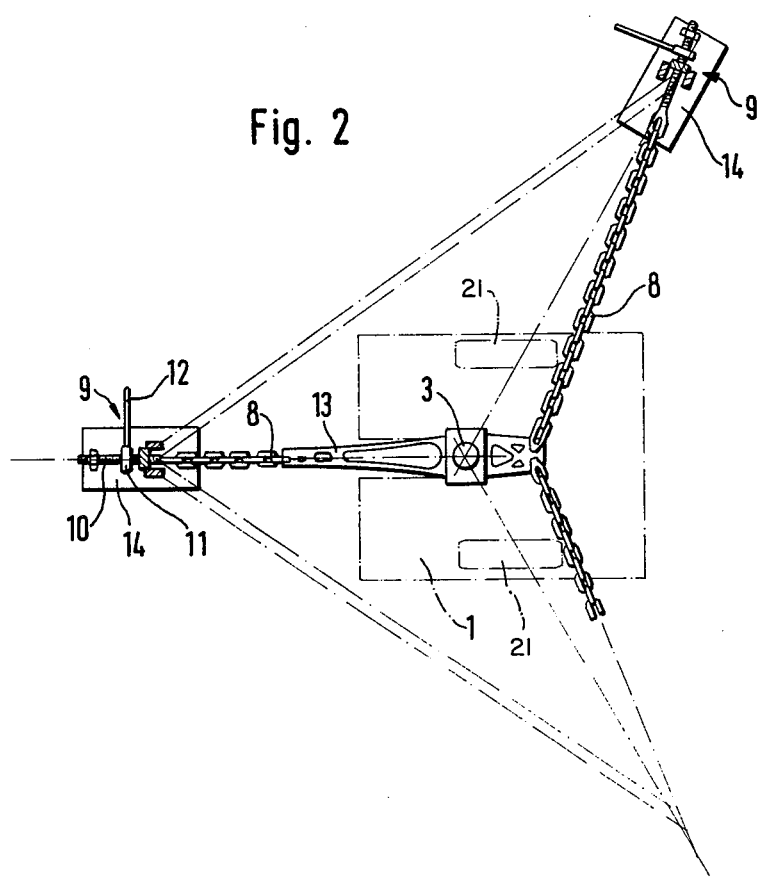

POSITIONING AND ORIENTING A MOBILE EQUIPMENT CARRIER FOR AN ANTENNA MAST

BACKGROUND OF THE INVENTION

The present invention relates to a stand for mobile equipment carriers, and more particularly, the invention relates to a construction for positioning and orienting trailers with an erectable antenna.

Equipment carriers of the type to which the invention pertains are, for example, constructed as single axis trailer vehicles carrying an erectable antenna. They are to be used, e.g. as mobile transmitters and/or receivers, and must be suitable placed within short periods of time and with little help and effort. It was found, however, that these antenna units cannot be just placed anywhere unless one is either sure that the antenna will, in fact, assume a vertical disposition or the location has, in fact, been prepared for that purpose. If the position of the antenna unit is changed frequently, preparation of the location becomes excessively burdensome, and just finding a place that permits vertical orientation without preparation is increasingly improbable.

DESCRIPTION OF THE INVENTION

It is an object of the present invention to provide structure which permits placement of an equipment carrier at a particular orientation without requiring preparation.

In accordance with the preferred embodiment of the invention, it is suggested that the equipment carrier be provided with support structure being particularly oriented and having vertically spaced support structure locations, and at least three legs are hinged to the upper one of the support structures at differently oriented horizontal pivot axis, while tension elements including, e.g. chains, hold the lower portions of the legs relative to the lower support structure. These tension elements are individually adjustable as to their effective length in that, for example, the chains are fastened to adjusting spindles carrying travelling nuts which bear against the legs. The length of tension elements is varied by turning the nuts. Upon pulling each of the tension elements inwardly, i.e. towards the equipment carrier, the latter can be lifted while the legs provide the requisite support on the ground. The legs may carry hinged feet to broaden the support on the ground.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side elevation of equipment and structure in accordance with the preferred embodiment of the present invention; and FIG. 2 is a top elevation of the device shown in FIG. 1.

Proceeding now to the detailed description of the drawings, the figures show a single axis trailer 1 having wheels 21 and carrying a support and mounting frame 2 for a retractable antenna mast, post or tower 3. This antenna is pivotably linked to the frame 2 pivot 15. The antenna mast can be pivoted down during transport or pivoted up and locked in a vertical position for erecting the antenna. Trailer 1 may have a supplemental front leg 22 and a third auxiliary wheel 23; these parts are unrelated to the invention.

The mast 3 as mounted in frame 2 establishes also the requisite support structure. A support ring 4 is mounted on the mast above the frame hinge and is provided with pivots 5 for hinging support legs 6. Each of the three legs 6 is constructed from two parts which are interconnected by a sleeve 6a. The lower part of each leg 6 is provided with a foot 14 being hinged to the leg.

Another support ring 7 is provided at the bottom of the mast 3, i.e. in a level below support structure-ring 4, and tension elements 8, such as chains, connect that ring 7 with the lower portions of the legs 6. The connection of the chains to the legs includes adjusting structure 9 which in each instance includes a threaded spindle 10 and a travelling nut 11. Each of the spindles is directly secured to the respective chain and the nut bears against the leg from the opposite side. The nut can be turned by means of a ratchet lever or crank 12 to adjust and vary the tension of and in the chain, and to pivot the respective leg towards or away from the equipment carrier.

Two of the three chains 8 are directly connected to ring element 7. The third chain is connected thereto via a hinged tension rod 13 in order to take up any twisting moment that may tend to disorient the carrier about a vertical axis. In either case, however, the effective length of each chain as determined by the spindle projection from the respective travelling nut, determines the hinge angle of each leg to thereby orient the mast in relation to the terrain.

In operation, the trailer is placed in position, and it is assumed that this position is on a slightly sloping hill or the like. Next, the legs 6 are assembled. The upper portion of each leg may be permanently hinged to the mast via the ring 4, so that the lower portion of each leg is now connected to the upper portion by the respective connecting sleeve 6a. The feet 14 are connected to the lower leg portion. The spindles are slidingly inserted in suitable bores in the legs. The chains may have been connected already to the spindles, and now the travelling nuts are threaded onto tension the chains to determine the angle the respective leg is to assume relative to the true vertical. The nuts bear against the legs in each instance.

Tensioning and shortening of all effective chain lengths may result in lifting the trailer off the ground so that the orientation of mast 3 is now exclusively determined (a) by the three point engagement of the three feet and ground, and (b) by the chains. The equipment rests entirely on the three legs (feet) and their orientation determines the orientation of the equipment.

The invention is not limited to the embodiments described above but all changes and modifications thereof not constituting departures from the spirit and scope of the invention are intended to be included.

I claim:

1. Structure for setting up, positioning and orienting a mobile equipment carrier, comprising:
   a support structure on the carrier, establishing two vertically spaced support locations;
   at least three legs, having their upper end hinged to said support structure at an upper one of the two locations; and
   tension elements adjustable as to their length and being with one end each affixed to said support structure at a lower one of the locations, and further affixed with their respective other end to portions of the legs near respective lower ends thereof so that the lower ends of the legs can be individually pivoted towards the carrier by shortening individually the effective lengths of the tension elements, permitting lifting of the support structure to thereby lift the carrier off the ground.

2. Structure as in claim 1, wherein the tensioning elements each are connected to a threaded adjustment spindle, and a nut travels on the spindle and bears against the respective leg near the lower end thereof to thereby connect the tensioning element to the leg.

3. Structure as in claim 1 or 2, the tensioning elements being chains.

4. Structure as in claim 3, wherein one of the chains is linked to the vertical support structure by means of a hinged tension rod.

5. Structure as in claim 1, each of the legs having a foot hinged to the respective leg.

* * * * *